(12) United States Patent
Ikadai (10) Patent No.: US 7,361,963 B2
(45) Date of Patent: Apr. 22, 2008

(54) OPTICAL FILM

(75) Inventor: Masahiro Ikadai, Mie-ken (JP)

(73) Assignee: Nippon Sheet Glass Company, Ltd., Tokyo (JP)

( * ) Notice: Subject to any disclaimer, the term of this patent is extended or adjusted under 35 U.S.C. 154(b) by 135 days.

(21) Appl. No.: 11/301,873

(22) Filed: Dec. 13, 2005

(65) Prior Publication Data
US 2006/0127604 A1 Jun. 15, 2006

(30) Foreign Application Priority Data
Dec. 15, 2004 (JP) ............................. 2004-363513

(51) Int. Cl.
*H01L 21/0232* (2006.01)
(52) U.S. Cl. .................. 257/435; 428/545; 428/620
(58) Field of Classification Search ................ 349/113; 257/435; 428/1.1, 1.62, 545, 620
See application file for complete search history.

(56) References Cited

U.S. PATENT DOCUMENTS 6,897,921 B2 * 5/2005 Furukawa et al. .......... 349/113
7,139,051 B2 * 11/2006 Park et al. ................... 349/113
2004/0247800 A1 * 12/2004 Yoshitake et al. ........... 428/1.3
2007/0040965 A1 * 2/2007 Kuan et al. ................. 349/113

FOREIGN PATENT DOCUMENTS

| JP | 6-345491 | | 12/1994 |
| JP | 09-113899 | * | 5/1997 |
| JP | 9-272172 | | 10/1997 |
| JP | 2000-56127 | | 2/2000 |

* cited by examiner

*Primary Examiner*—W. David Coleman
(74) *Attorney, Agent, or Firm*—Cohen Pontani Lieberman & Pavane LLP (57) ABSTRACT

An optical film which enables desired optical properties to be obtained easily, and enables the durability to be improved. A metal film 32 is formed on an inner major surface 12a of a glass substrate 12. A plurality of first island structures 33 is formed scattered as islands on an inner major surface 32a of the metal film 32. A plurality of second island structures 31 is formed scattered as islands on the inner major surface 12a of the substrate 12. At least one set of the plurality of first island structures 33 and the plurality of second island structures 31 are made of at least one selected from the group consisting of metals and metal oxides having a different standard electrode potential to a metal of the metal film 32.

9 Claims, 5 Drawing Sheets

OPTICAL FILM

BACKGROUND OF THE INVENTION

1. Field of the Invention

The present invention relates to an optical film, and more particularly, to an optical film suitable for use in a light-reflecting substrate having a thin metal film coated on a surface thereof and used for a reflection type liquid crystal display apparatus or a joint reflection/transmission type liquid crystal display apparatus.

2. Description of the Related Art

Hitherto, liquid crystal display apparatuses have been widely used, in particular, for displays of small-to medium-sized apparatuses, this being due to characteristic features such as it being possible to make the apparatus thinner and more compact than with a conventional CRT display, it being possible to operate the display at a low voltage, and it being possible to reduce electrical power consumption and thus save energy. Moreover, of liquid crystal display apparatuses, in particular reflection type liquid crystal display apparatuses, which use incident light from outside as a display light source, are constructed, for example, from a liquid crystal layer, and a light-reflecting substrate having an optical film coated with a thin film of a metal such as a silver alloy. A conventionally required backlight is not required, and hence such reflection type liquid crystal display apparatuses can be made light and thin, and are thus widely used as liquid crystal display apparatuses.

For such liquid crystal display apparatuses, in recent years, from the standpoint of further improving the visibility, there have been demands to reduce the optical absorptivity of the light-reflecting substrate and improve the durability under harsh environments such as an oxidizing atmosphere. Various research has been carried out into fulfilling these objectives.

For example, for an optical film constructed from three oxide thin film layers and two silver thin film layers are formed alternately on a major surface of a glass substrate, by making the two silver thin film layers have a stable crystal orientation, the stability of the silver thin films under high temperature and high humidity can be improved (see, for example, Japanese Laid-open Patent Publication (Kokai) No. 2000-056127).

Moreover, another optical film is constructed from a heat-reflecting metal film made of a silver-based metal formed on a transparent substrate, and a transparent nitride film made of a nitride of at least one metal selected from the group consisting of silicon, boron and aluminum formed on the heat-reflecting metal film, whereby oxidation of the heat-reflecting metal film is suppressed by the transparent nitride film (see, for example, Japanese Laid-open Patent Publication (Kokai) No. H06-345491).

Furthermore, another optical film is constructed from a transparent high refractive index layer made of indium tin oxide (hereinafter referred to as "ITO") formed on a major surface of a transparent substrate, a thin metal film formed on the transparent high refractive index layer, and another transparent high refractive index layer made of ITO formed on the thin metal film, whereby the environmental durability of the thin metal film is increased by the adjacent transparent high refractive index layers made of ITO (see, for example, Japanese Laid-open Patent Publication (Kokai) No. H09-272172).

However, of these optical films, in particular for the optical film having thin metal films that are stabilized through their crystallinity, there is a problem that in an oxidizing atmosphere, the effect of the redox potential on material values is large, and hence the durability of the thin metal films drops. Furthermore, for the optical films having a transparent nitride film made of a metal nitride or transparent high refractive index layers made of ITO, it is difficult to obtain desired optical properties due to the overall thickness of the optical film becoming high, and moreover there is a problem that the thin metal film is exposed to the atmosphere due to minute pinholes present in the transparent nitride film or the transparent high refractive index layers made of ITO, and hence the durability of the thin metal film drops.

SUMMARY OF THE INVENTION

It is an object of the present invention to provide an optical film which enables desired optical properties to be obtained easily, and enables the durability to be improved.

To attain the above object, in an aspect of the present invention, there is provided an optical film formed on a major surface of a substrate, the optical film comprising a metal film formed on the major surface of the substrate and at least one set of a plurality of first island structures formed scattered as islands on a major surface of the metal film and a plurality of second island structures formed scattered as islands on the major surface of the substrate, wherein the at least one set of the plurality of first island structures and the plurality of second island structures are made of at least one selected from the group consisting of metals and metal oxides having a different standard electrode potential to a metal of the metal film.

Preferably, a mean pitch of the at least one set of the plurality of first island structures and the plurality of second island structures is not less than 400 nm.

More preferably, the mean pitch is in a range of 400 nm to 900 nm.

More preferably, a percentage ratio of an equivalent circle mean diameter to the mean pitch for the at least one set of the plurality of first island structures and the plurality of second island structures is in a range of 10% to 90%.

Preferably, a mean height of the at least one set of the plurality of first island structures and the plurality of second island structures is in a range of 2.0 nm to 7.0 nm.

Preferably, the metal film is made of at least one selected from the group consisting of metals having a positive standard electrode potential, and the at least one set of the plurality of first island structures and the plurality of second island structures are made of at least one selected from the group consisting of metals and metal oxides having a negative standard electrode potential.

More preferably, the metal film is made of at least one selected from the group consisting of silver, chromium, and aluminum.

Still more preferably, the at least one set of the plurality of first island structures and the plurality of second island structures comprise indium tin oxide.

Preferably, the substrate is made of glass.

Preferably, an optical film is used in a light-reflecting substrate for an apparatus selected from a reflection type liquid crystal display apparatus and a joint reflection/transmission type liquid crystal display apparatus.

According to the present invention, there are at least one set of a plurality of first island structures formed scattered as islands on the major surface of the metal film and/or a plurality of second island structures formed scattered as islands on the major surface of the substrate, wherein the first and/or second island structures are made of at least one selected from the group consisting of metals and metal oxides having a different standard electrode potential to the metal of the metal film. As a result, the optical film can be made thin, whereby the degree of freedom for the film design and the optical properties can be improved, and hence desired optical properties can be obtained easily. In addition, plasma oscillations of free electrons having different phases arise between the first and/or second island structures and the metal film, and a redox potential change for an oxidation reaction of the first and/or second island structures and a redox potential change for an oxidation reaction of the metal film stop substantially in an equilibrium state, whereby corrosion of the metal film can be prevented, and hence the durability of the optical film can be improved.

The above and other objects, features, and advantages of the invention will become more apparent from the following detailed description taken in conjunction with the accompanying drawings.

BRIEF DESCRIPTION OF THE DRAWINGS

FIGS. 2A and 2B are views showing a reflection type liquid crystal substrate appearing in FIG. 1; specifically:

DETAILED DESCRIPTION OF THE PREFERRED EMBODIMENTS

The present inventors carried out assiduous research to attain the above object, and as a result discovered that, in the case of an optical film formed on a major surface of a substrate, if the optical film is comprised of a metal film formed on the major surface of the substrate, and a plurality of first island structures formed scattered as islands on a major surface of the metal film and/or a plurality of second island structures formed scattered as islands on the major surface of the substrate, wherein the first and/or second island structures are made of at least one selected from the group consisting of metals and metal oxides having a different standard electrode potential to a metal of the metal film, then the optical film can be made thin, whereby the degree of freedom for the film design and the optical properties can be improved, and hence desired optical properties can be obtained easily. In addition, plasma oscillations of free electrons having different phases arise between the first and/or second island structures and the metal film, and a redox potential change for an oxidation reaction of the first and/or second island structures and a redox potential change for an oxidation reaction of the metal film stop substantially in an equilibrium state, whereby corrosion of the metal film can be prevented, and hence the durability of the optical film can be improved. Moreover, the present inventors also discovered that if a mean pitch of the first and/or second island structures is not less than 400 nm, preferably in a range of 400 nm to 900 nm, then this mean pitch is approximately equal to or greater than the wavelength of the plasma oscillations of free electrons in the island structures (400 nm), whereby corrosion of the metal film can be yet better prevented. Furthermore, the present inventors also discovered that if the metal film is made of at least one selected from the group consisting of metals having a positive standard electrode potential, and the first and/or second island structures are made of at least one selected from the group consisting of metals and metal oxides having a negative standard electrode potential, then the plasma oscillations of free electrons arising when the island structures are oxidized and the plasma oscillations of free electrons arising when the metal film is oxidized cancel one another out, whereby redox potential changes for the island structures and a redox potential change for the metal film are stopped respectively, and hence the durability of the metal film can be further improved.

The present invention was accomplished based on the above research results.

The present invention will now be described with reference to the drawings showing a preferred embodiment thereof.

Figure 1:
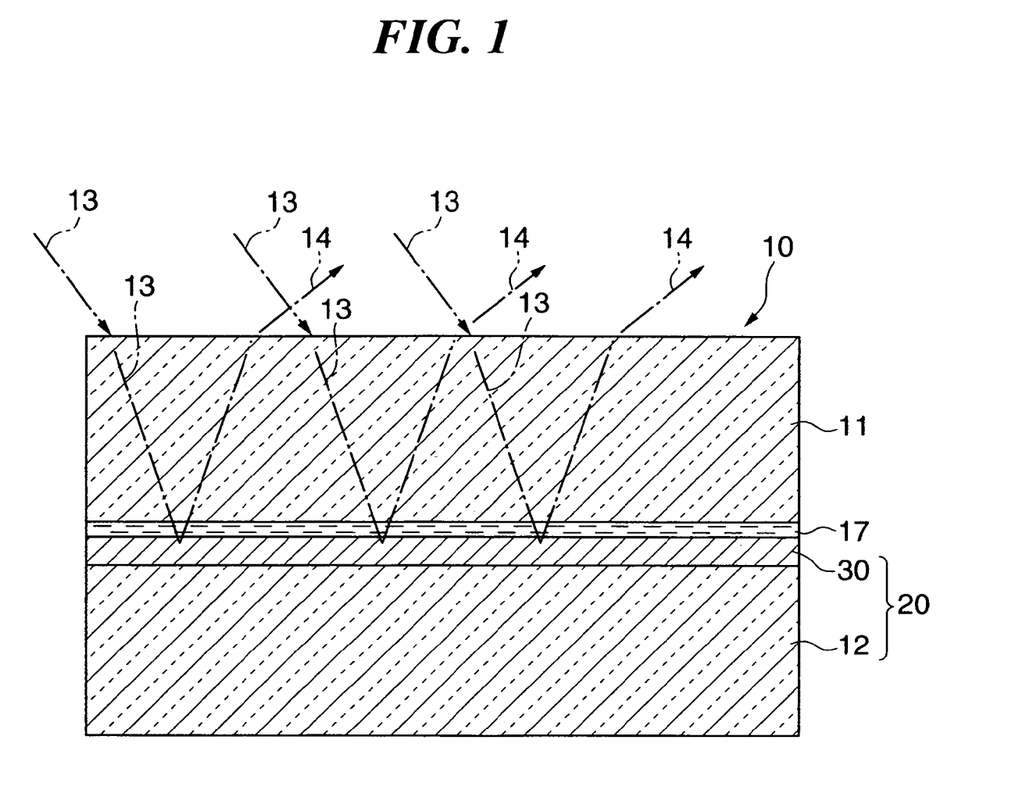
FIG. 1 is a sectional view schematically showing the structure of a reflection type liquid crystal display apparatus having an optical film according to an embodiment of the present invention.

FIG. 1 is a sectional view schematically showing the structure of a reflection type liquid crystal display apparatus having an optical film according to an embodiment of the present invention.

As shown in FIG. 1, the reflection type liquid crystal display apparatus 10 is comprised of a pair of glass substrates 11 and 12 that transmit light, an optical film 30 that is formed on an inner major surface of the glass substrate 12 and scatters incident light 13 and reflects this light as reflected light 14, and a liquid crystal layer 17 that is filled between the optical film 30 and the glass substrate 11 and controls the transmission of light. Of the component elements of the reflection type liquid crystal apparatus 10, the glass substrate 12 and the optical film 30 together constitute a reflection type liquid crystal substrate 20, shown in FIG. 1. The refection type liquid crystal substrate 20 and the optical film 30 will now be described in detail using FIGS. 2A and 2B.

Figure 2A:
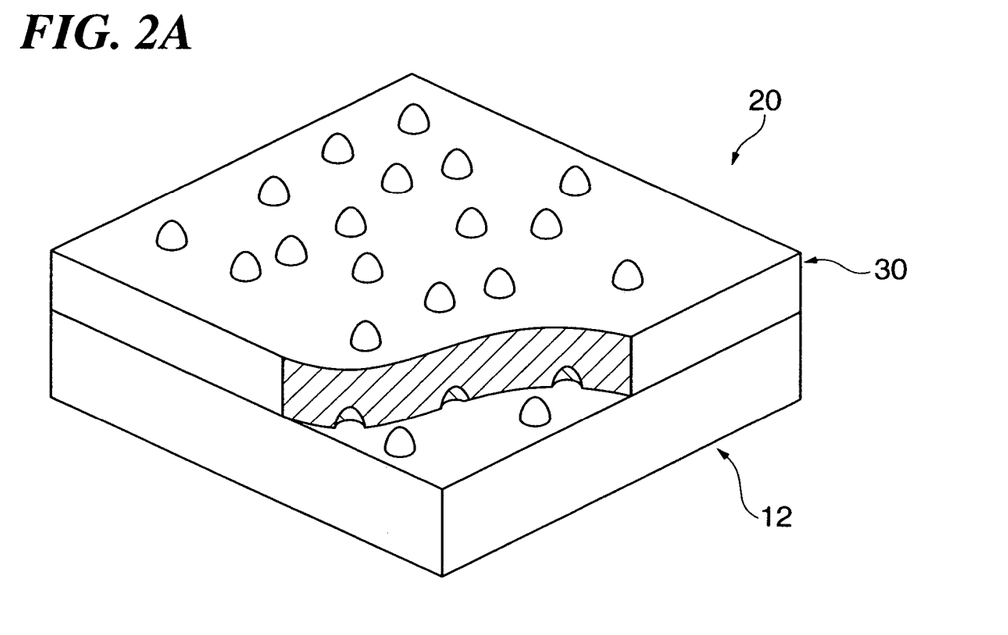
FIG. 2A is a partially cut away perspective view.
Figure 2B:
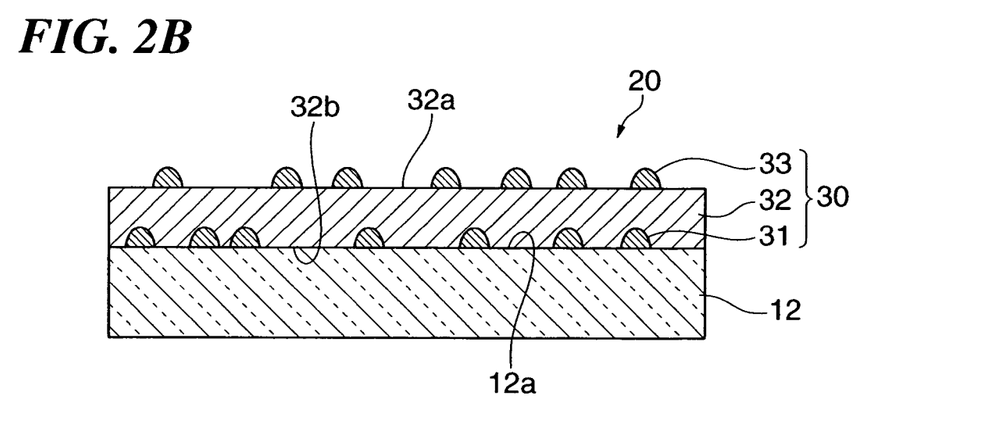
FIG. 2B is a sectional view.

FIGS. 2A and 2B are views showing the reflection type liquid crystal substrate 20 appearing in FIG. 1; specifically, FIG. 2A is a partially cut away perspective view, and FIG. 2B is a sectional view.

As shown in FIG. 2A, the reflection type liquid crystal substrate 20 is, for example, 0.55 mm thick, and is comprised of the glass substrate 12, and the optical film 30 which is formed on the inner major surface of the glass substrate 12.

Moreover, as shown in FIG. 2B, the optical film 30 has a plurality of island structures (hereinafter referred to as "the second island structures") 31 formed scattered as islands over the inner major surface 12a of the glass substrate 12, a metal film 32 formed on the second island structures 31 and the inner major surface 12a of the glass substrate 12, a plurality of island structures (hereinafter referred to as "the first island structure") 33 formed scattered as islands over an major surface (hereinafter referred to as "the inner major surface) 32a of the metal film 32 on the opposite side to a major surface 32b contacting the glass substrate 12.

The metal film 32 is made of at least one selected from the group consisting of metals having a positive standard electrode potential, and preferably made of at least one selected from the group consisting of silver, chromium, and aluminum, this being silver in the present embodiment.

Each set of the first island structures 33 and the second island structures 31 are made of at least one selected from the group consisting of metals and metal oxides, where each of the metals and the metal oxides has a different standard electrode potential to the metal of the metal film 32, and preferably has a negative standard electrode potential, this being ITO in the present embodiment. As a result, plasma oscillations of free electrons arising when the second island structures 31 and 33 are oxidized and plasma oscillations of free electrons arising when the metal film 32 is oxidized cancel one another out, whereby redox potential changes for the second island structures 31 and 33 and a redox potential change for the metal film 32 are stopped respectively, and hence the durability of the metal film 32 can be further improved.

The mean pitch of the second island structures 31 and 33 is not less than 400 nm, preferably in a range of 400 nm to 900 nm. As a result, this mean pitch is approximately equal to or greater than the wavelength of the plasma oscillations of free electrons in the second island structures 31 and 33 (400 nm), whereby corrosion of the metal film 32 can be yet better prevented.

Moreover, the percentage ratio of an equivalent circle mean diameter to the mean pitch for the second island structures 31 and 33 is in a range of 10% to 90%. As a result, corrosion of the metal film 32 can be prevented yet more reliably.

Figure 3:
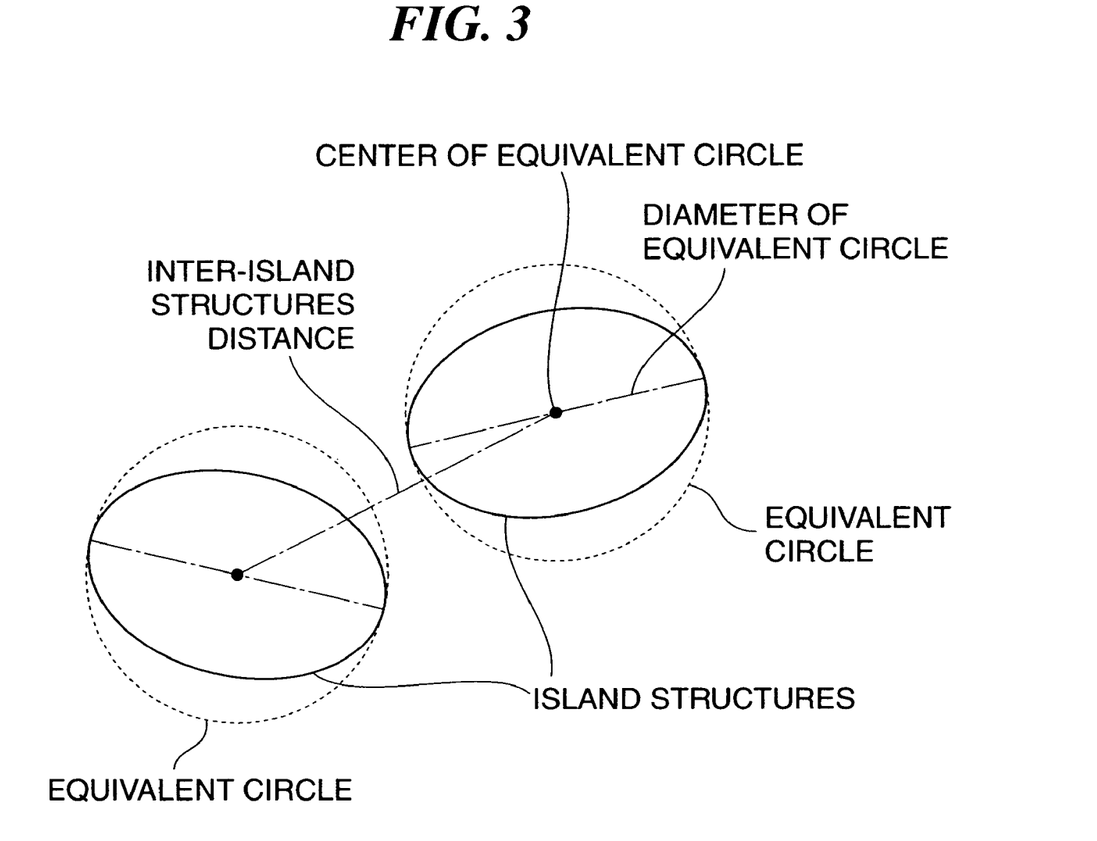
FIG. 3 is a view useful in explaining equivalent circles for island structures formed on a major surface of a glass substrate or a metal film.

Here, the equivalent circle of an island structure means the circle of radius equal to the maximum value of the distance across the area where the island structure contacts the inner major surface of the glass substrate 12 or the metal film 32 as shown in FIG. 3. The equivalent circle mean diameter means the mean value of the diameters of the equivalent circles for at least 10 randomly selected island structures on the glass substrate 12 or the metal film 32.

Moreover, the mean pitch of the island structures means the mean, over at least 10 randomly selected island structures on the glass substrate 12 or the metal film 32, of the distance between the center of the equivalent circle for one island structure and the center of the equivalent circle for the island structure nearest to that island structure (the inter-island structure distance).

The metal film 32 has a thickness in a range of 10 nm to 500 nm, for example, 25 nm, the second island structures 31 have a mean height in a range of 2.0 nm to 7.0 nm, and the first island structures 33 have a mean height in a range of 2.0 nm to 7.0 nm. As a result, corrosion of the metal film 32 can be prevented yet more reliably. The mean height of each of the second island structures 31 and 33 is more preferably in a range of 3.0 nm to 5.0 nm. As a result, corrosion of the metal film 32 can be prevented yet more reliably.

Here, the mean height of the island structures means the mean, over at least 10 randomly selected island structures on the glass substrate 12 or the metal film 32, of the distance from the inner major surface of the glass substrate 12 or the metal film 32 to the highest point of the island structure.

A method of manufacturing the reflection type liquid crystal substrate 20 will now be described.

Figure 4:
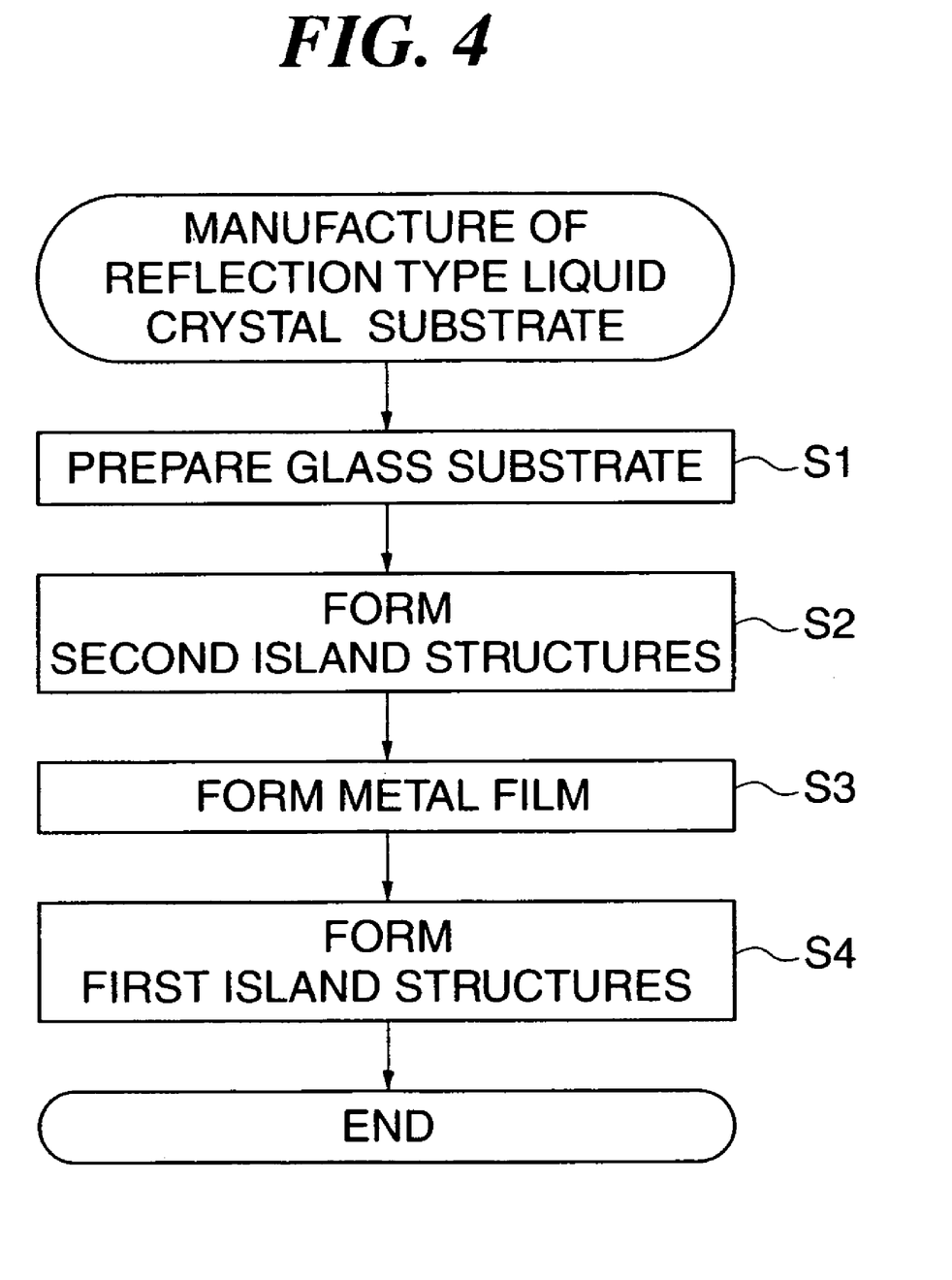
FIG. 4 is a flow diagram showing a method of manufacturing the reflection type liquid crystal substrate shown in FIGS. 2A and 2B.

FIG. 4 is a flow diagram showing a method of manufacturing the reflection type liquid crystal substrate 20 shown in FIGS. 2A and 2B, and FIGS. 5A to 5D are views useful in explaining steps in the method of manufacturing the reflection type liquid crystal substrate 20.

Figure 5A:
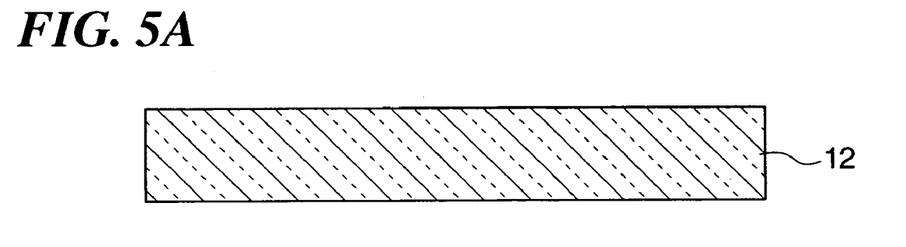
FIGS. 5A to 5D are views useful in explaining steps in the method of manufacturing the reflection type liquid crystal substrate in FIGS. 2A and 2B.
Figure 5B:
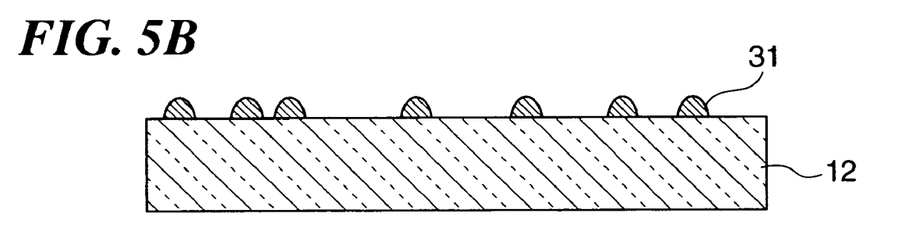
Figure 5C:
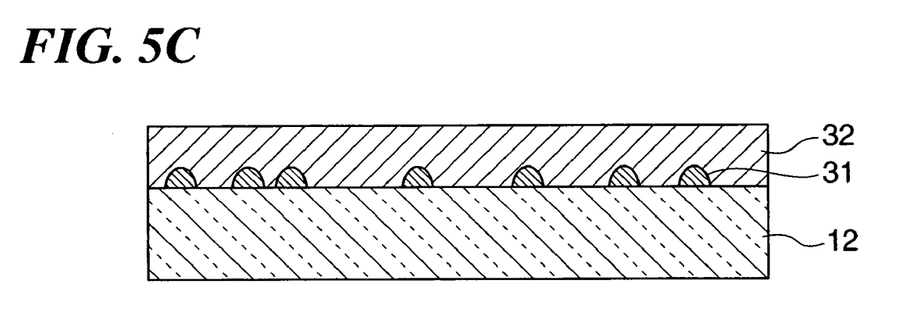

As shown in FIG. 4, first the glass substrate 12 is prepared by cutting to predetermined dimensions plate glass of thickness 0.55 mm that has been manufactured using a float glass process (step S1) (FIG. 5A). The second island structures 31 are then formed scattered over one major surface of the glass substrate 12 using a sputtering method (step S2) (FIG. 5B).

Specifically, the second island structures 31 are formed such that the equivalent circle mean diameter thereof is, for example, 130 nm, and the mean height thereof is, for example, 3 nm. Moreover, the second island structures 31 are formed such that the mean pitch thereof is, for example, 520 nm, and the percentage ratio of the equivalent circle mean diameter to the mean pitch for the second island structures 31 is, for example, 25%.

Figure 5D:
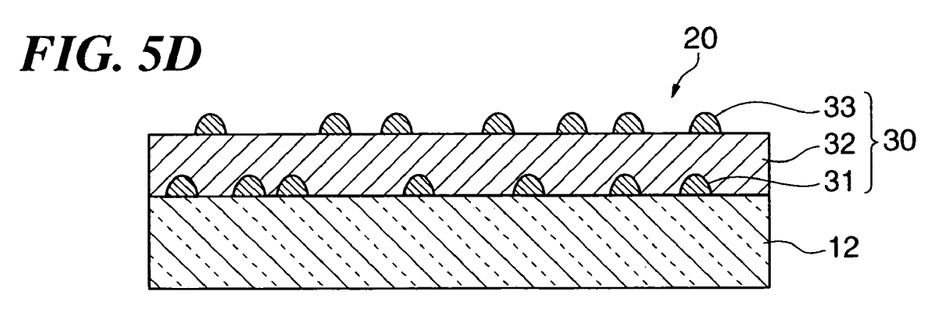

Next, the metal film 32 is formed to a thickness of 25 nm using a sputtering method on the major surface of the glass substrate 12 on which the second island structures 31 have been formed (step S3) (FIG. 5C), and then the first island structures 33 are formed scattered over an inner major surface of the metal film 32 using a sputtering method (step S4) (FIG. 5D).

Specifically, the first island structures 33 are formed such that the equivalent circle mean diameter thereof is, for example, 130 nm, and the mean height thereof is, for example, 3 nm. Moreover, the first island structures 33 are formed such that the mean pitch thereof is, for example, 520 nm, and the percentage ratio of the equivalent circle mean diameter to the mean pitch for the first island structures 33 is, for example, 25%.

According to the present embodiment, the first island structures 33 formed scattered over the inner major surface 32a of the metal film 32 formed on the inner major surface 12a of the glass substrate 12, and the second island structures 31 formed scattered over the inner major surface 12a of the glass substrate 12 contacting the metal film 32 are each made of a metal oxide or metal having a different standard electrode potential to the metal of the metal film 32. As a result, the optical film can be made thin, whereby the degree of freedom for the film design and the optical properties can be improved, and hence desired optical properties can be obtained easily. In addition, plasma oscillations of free electrons having different phases arise between the first island structures 33 and the metal film 32 and between the second island structures 31 and the metal film 32, and a redox potential change for an oxidation reaction of the island structures 31 and 33 and a redox potential change for an oxidation reaction of the metal film 32 stop substantially in an equilibrium state, whereby corrosion of the metal film 32 can be prevented, and hence the durability of the optical film can be improved. Moreover, corrosion of the metal film 32 is prevented by interference of the plasma oscillations arising between the first island structures 33 and the metal film 32 and between the second island structures 31 and the metal film 32, and hence even if the dots constituting the first island structures 33 are not formed uniformly over the metal film 32 but rather dots are partially missing, corrosion of the metal film 32 can still be prevented by the interference effect due to dots formed around the part where the dots are missing.

In the present embodiment, there are first island structures 33 formed scattered over the inner major surface of the metal film 32 formed on the inner major surface of the glass substrate 12, and second island structures 31 formed scattered over the inner major surface of the glass substrate 12 contacting the metal film 32. However, there is no limitation to this, but rather there may alternatively be only one of first island structures 33 formed scattered over the inner major surface of the metal film 32, and second island structures 31 formed scattered over the inner major surface of the glass substrate 12 contacting the metal film 32. In the case that the optical film 30 has only the first island structures 33, it is predominantly corrosion at the inner major surface of the metal film 32 that can be prevented, whereas in the case that the optical film 30 has only the second island structures 31, it is predominantly corrosion at the major surface of the metal film 32 contacting the glass substrate 12 that can be prevented. As a result of the above, the optical film can be made yet thinner, and moreover the durability of the optical film can be improved.

In the present embodiment, the optical film 30 is used in the reflection type liquid crystal display apparatus 10. However, there is no limitation to this, but rather the optical film 30 may also be used in a joint reflection/transmission type liquid crystal apparatus that uses reflected external light when the amount of external light is high, and uses light from a backlight when the amount of external light is low.

In the present embodiment, the first island structures 33 are formed as islands on the inner major surface of the metal film 32. However, there is no limitation to this, but rather such first island structures 33 may be formed on a surface of another solid made of a metal oxide or metal having a different standard electrode potential to the first island structures 33. As a result, corrosion of a solid made of a metal oxide or metal used in any of various applications can be prevented, whereby the durability of the metal can easily be improved.

Examples of the present invention will now be described. In the present examples, experiments were carried out using an optical film having only first island structures 33 formed scattered as islands on the inner major surface of the metal film 32.

First, as Example 1, a sample was prepared by forming a 25 nm-thick metal film 32 made of silver on one major surface of a glass substrate 12, and then forming first island structures 33 made of ITO on the metal film 32 using a sputtering method as a coating on the metal film 32 such that the mean pitch of the first island structures 33 was 520 nm.

Next, as Comparative Example 1, a sample was prepared by forming a 25 nm-thick metal film 32 made of silver on one major surface of a glass substrate 12, and then forming a 10 nm-thick ITO film on the metal film 32 using a sputtering method. Furthermore, as Comparative Example 2, a sample was prepared by forming only a 25 nm-thick metal film 32 made of silver on one major surface of a glass substrate 12.

Next, each of the samples was immersed for 15 minutes in a 10 mass % HCl aqueous solution at room temperature, and it was determined whether or not the metal film 32 was corroded. The results are shown in Table 1.

TABLE 1

|  | METAL FILM | COATING | EVALUATION |
|---|---|---|---|
| EXAMPLE 1 | 25 nm | ITO IN ISLANDS | ○ |
| COMPARATIVE EXAMPLE 1 | 25 nm | ITO FILM | X |
| COMPARATIVE EXAMPLE 2 | 25 nm | NONE | X |

In Table 1, "○" indicates that the metal film 32 was not corroded, and "x" indicates that the metal film 32 was corroded.

As shown in Table 1, it was found that if first island structures 33 formed scattered over a major surface of a silver metal film 32 formed on a major surface of a glass substrate 12 are made of ITO, which has a different standard electrode potential to the metal of the metal film 32, then not only can the optical film be made thin so that the degree of freedom for the film design and the optical properties can be improved, but moreover the durability of the optical film can be improved.

Next, as Example 2, a sample was prepared by forming a 25 nm-thick metal film 32 made of silver on one major surface of a glass substrate 12, and then forming first island structures 33 made of ITO on the metal film 32 using a sputtering method as a coating on the metal film 32 such that the mean pitch of the first island structures 33 was 900 nm. As Example 3, a sample was prepared by forming a 25 nm-thick metal film 32 made of silver on one major surface of a glass substrate 12, and then forming first island structures 33 made of ITO on the metal film 32 such that the mean pitch of the first island structures 33 was 520 nm. As Example 4, a sample was prepared by forming a 25 nm-thick metal film 32 made of silver on one major surface of a glass substrate 12, and then forming first island structures 33 made of ITO on the metal film 32 such that the mean pitch of the first island structures 33 was 420 nm. As Example 5, a sample was prepared by forming a 25 nm-thick metal film 32 made of silver on one major surface of a glass substrate 12, and then forming first island structures 33 made of ITO on the metal film 32 such that the mean pitch of the first island structures 33 was 410 nm. As Comparative Example 3, a sample was prepared by forming a 25 nm-thick metal film 32 made of silver on one major surface of a glass substrate 12, and then forming first island structures 33 made of ITO on the metal film 32 using a sputtering method as a coating on the metal film 32 such that the mean pitch of the first island structures 33 was 400 nm.

Next, for each sample, the major surface of the metal film 32 having the first island structures 33 formed thereon was observed using a scanning electron microscope, a micrograph was taken at a magnification of 15,000 to 20,000, a diagonal line was drawn across a print of the micrograph taken of the major surface of the metal film 32, 10 to 20 of the first island structures 33 on the diagonal line were selected to be used in measurement, and the equivalent circle mean diameter and the mean pitch were determined from the selected island structures. In the case that the island structures were small on the print and hence it was difficult to determine the equivalent circles, the inter-island structure distance was first measured, and the mean pitch determined from this distance was taken as the equivalent circle mean diameter.

Moreover, a section of each sample having the metal film 32 and the first island structures 33 formed on one major surface of the glass substrate 12 was observed using a scanning electron microscope, 10 to 20 of the observed first island structures 33 were selected to be used in measurement, and the mean height was determined from the selected island structures.

For Example 2, the equivalent circle mean diameter for the first island structures 33 was 90 nm, and the mean height was 2.0 nm. For Example 3, the equivalent circle mean diameter for the first island structures 33 was 130 nm, and the mean height was 3.0 nm. For Example 4, the equivalent circle mean diameter for the first island structures 33 was 210 nm, and the mean height was 5.0 nm. For Example 5, the equivalent circle mean diameter for the first island structures 33 was 290 nm, and the mean height was 7.0 nm.

Next, each of the samples was immersed for 15 minutes in a 10 mass % HCl aqueous solution at room temperature, and it was determined whether or not the metal film 32 was corroded. The results are shown in Table 2.

TABLE 2

|  | MEAN PITCH (nm) | EQUIVALENT CIRCLE MEAN DIAMETER (nm) | RATIO OF EQUIVALENT CIRCLE MEAN DIAMETER TO MEAN PITCH (%) |
|---|---|---|---|
| COMPARATIVE EXAMPLE 2 | 0 | 0 | 0 |
| EXAMPLE 2 | 900 | 90 | 10 |
| EXAMPLE 3 | 520 | 130 | 25 |
| EXAMPLE 4 | 420 | 210 | 50 |
| EXAMPLE 5 | 410 | 290 | 70 |
| COMPARATIVE EXAMPLE 3 | 400 | 400 | 100 |

|  | MEAN HEIGHT OF ISLAND STRUCTURES (nm) | EVALUATION |
|---|---|---|
| COMPARATIVE EXAMPLE 2 | 0.0 | X |
| EXAMPLE 2 | 2.0 | ○ |
| EXAMPLE 3 | 3.0 | ○ |
| EXAMPLE 4 | 5.0 | ○ |
| EXAMPLE 5 | 7.0 | ○ |
| COMPARATIVE EXAMPLE 3 | 10 | X |

In Table 2, "O" indicates that the metal film 32 was not corroded, and "x" indicates that the metal film 32 was corroded.

As shown in Table 2, it was found that if the mean pitch of the first island structures 33 is not less than 400 nm, preferably in a range of 400 nm to 900 nm, then due to the mean pitch being approximately equal to or greater than the wavelength of the plasma oscillations of free electrons in the first island structures 33 (400 nm), corrosion of the metal film 32 can be better prevented. Moreover, it was found that if the percentage ratio of the equivalent circle mean diameter to the mean pitch for the first island structures 33 is in a range of 10% to 90%, then corrosion of the metal film 32 can be prevented more reliably. Furthermore, it was found that if the mean height of the first island structures 33 is in a range of 2.0 nm to 7.0 nm, then corrosion of the metal film 32 can be prevented more reliably.

What is claimed is:

1. An optical film formed on a major surface of a substrate, the optical film comprising:
   a metal film formed on the major surface of the substrate; and
   at least one set of a plurality of first island structures formed scattered as islands on a major surface of said metal film and a plurality of second island structures formed scattered as islands on the major surface of the substrate;
   wherein said at least one set of the plurality of first island structures and the plurality of second island structures are made of at least one selected from the group consisting of metals and metal oxides having a different standard electrode potential to a metal of said metal film, and
   wherein said metal film is made of at least one selected from the group consisting of metals having a positive standard electrode potential, and said at least one set of the plurality of first island structures and the plurality of secon disland structures are made of at least one selected from the group consisting of metals and metal oxides having a negative standard electrode potential.

2. An optical film as claimed in claim 1, wherein a mean pitch of said at least one set of the plurality of first island structures and the plurality of second island structures is not less than 400 nm.

3. An optical film as claimed in claim 1, wherein a mean height of said at least one set of the plurality of first island structures and the plurality of second island structures is in a range of 2.0 nm to 7.0 nm.

4. An optical film as claimed in claim 1, wherein said metal film is made of at least one selected from the group consisting of silver, chromium, and aluminum.

5. An optical film as claimed in claim 1, wherein the substrate is made of glass.

6. An optical film as claimed in claim 1, used in a light-reflecting substrate for an apparatus selected from a reflection type liquid crystal display apparatus and a joint reflection/transmission type liquid crystal display apparatus.

7. An optical film as claimed in claim 2, wherein the mean pitch is in a range of 400 nm to 900 nm.

8. An optical film as claimed in claim 2, wherein a percentage ratio of an equivalent circle mean diameter to the mean pitch for said at least one set of the plurality of first island structures and the plurality of second island structures is in a range of 10% to 90%.

9. An optical film as claimed in claim 4, wherein said at least one set of the plurality of first island structures and the plurality of second island structures comprise indium tin oxide.

* * * * *